United States Patent Office 2,869,646
Patented Jan. 20, 1959

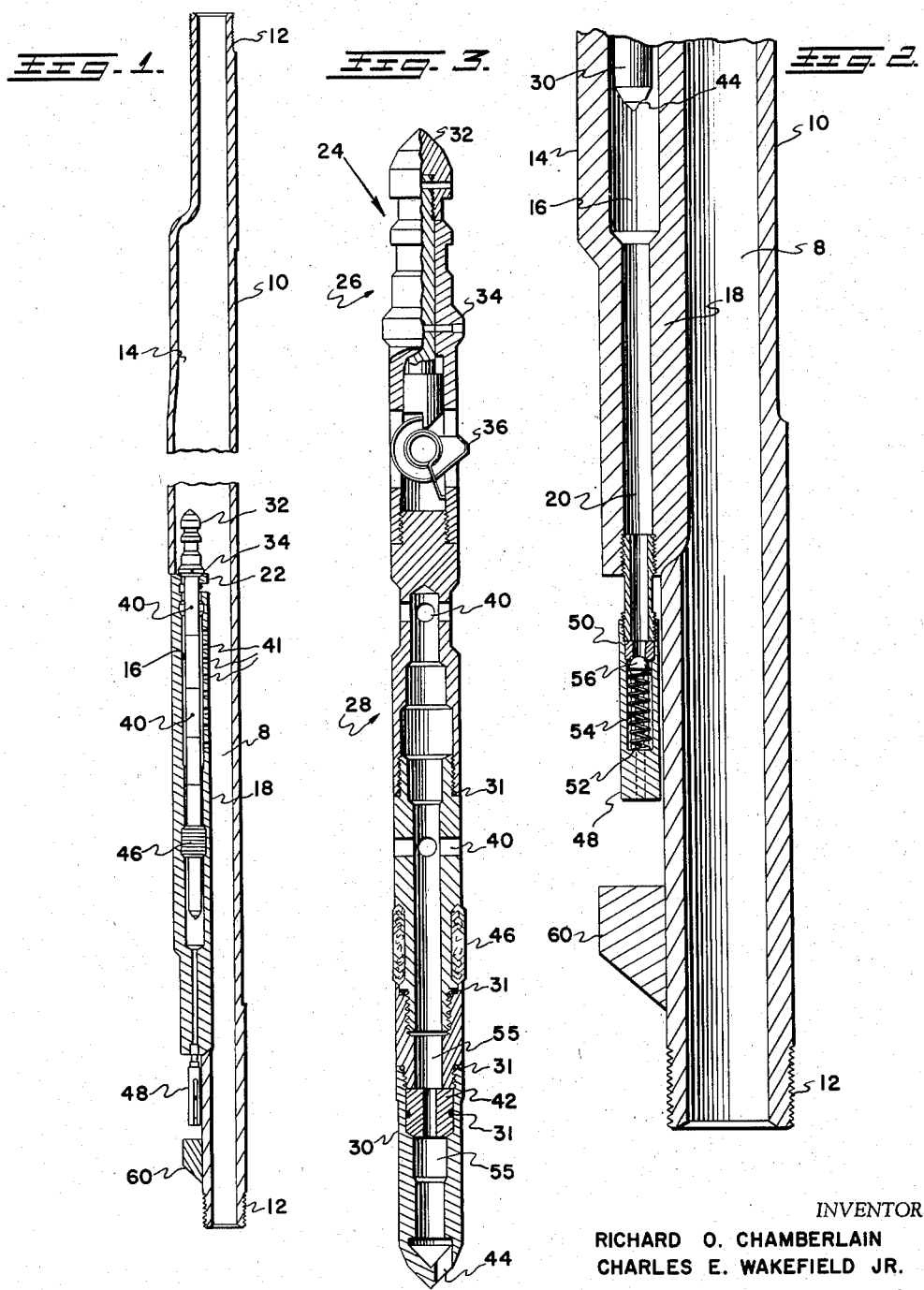

2,869,646

FLOW CONTROL APPARATUS

Richard O. Chamberlain, Cuyama, and Charles E. Wakefield, Jr., Bakersfield, Calif., assignors to Richfield Oil Corporation, Los Angeles, Calif., a corporation of Delaware Application February 18, 1955, Serial No. 489,246

3 Claims. (Cl. 166—185)

This invention relates to the control of fluid flow in oil and gas wells. In particular, this invention is concerned with an apparatus for use in systems adapted for selectively controlling the flow of fluids into a plurality of producing formations within a well.

In our copending application, Serial No. 473,782, filed December 8, 1954, we have disclosed a system for controlling flow of fluids injected into and removed from a plurality of vertically spaced formations within a cased well bore. As discussed in our prior application, for maximum efficiency in controlling wells having a plurality of vertically spaced formations it is essential that flow control means employed be removable and insertable without the necessity of disturbing flow control members located on a higher level.

In our copending application, Serial No. 489,245, filed February 18, 1955, we have disclosed certain flow control member combinations particularly useful in the systems constituting the subject matter of our application Serial No. 473,782. The instant application is directed to certain novel flow control combinations particularly useful for injecting fluids into the producing formations.

Thus, we have devised certain novel injection flow control combinations comprising defined tubular valve means, an enlarged piping section which constitutes the operational environment of the tubular valve means and means disposed below the valve means capable of preventing undesired flow into the valve means from the formation. The essential apparatus comprising our invention includes a piping section having a through bore and provided with a laterally enlarged portion intermediate its ends, a tubular valve seat disposed within the laterally enlarged section, a tubular valve means, means adapted to facilitate retention of the valve means in operative position and check valve means external of the pipe section and communicating with the valve seat.

The invention will be most readily understood by reference to the attached drawing in which Figure 1 is a fragmentary vertical section of a flow control combination of the present invention showing a valve means in operative position, and Figure 2 is an enlarged vertical section of the lower portion of the flow member combination showing in greater detail the check valve means, and Figure 3 is a vertical section of a valve means which may be employed in this invention.

Referring now to the drawing, the numeral 10 represents a piping section adapted at its ends 12 to be engaged in a pipe string of a well bore. Piping section 10 is provided with a through bore 8 and with a laterally enlarged portion 14 intermediate its ends. In the laterally enlarged portion 14 is an area comprising a valve seat 16. As shown, valve seat 16 is defined by the outer wall of the laterally enlarged portion of the piping section 10 and a wall 18. The lower end portion 20 of the valve seat 16 opens externally of the piping section 10. Means 22 are provided to facilitate retention of the valve means within the valve seat of the flow member combination. Advantageously means 22 takes the form of a ring spaced above the top of the valve seat area and may be formed by removing a section of wall 18 to provide the ring-like retaining member.

Disposed within the valve seat of the laterally enlarged portion 14 of piping section 10 is the tubular valve means or bored valve body generally indicated by the numeral 24 (refer especially to Figure 3). Advantageously, the valve means 24 may be considered to be composed of a plurality of threadingly engaged sections comprising an upper portion 26, an intermediate portion 28 and a bottom portion 30. The valve means can be a single unitary structure adapted to have the characteristics discussed below or it may be composed of a plurality of sections. When the means is composed of a plurality of sections, it should be understood that suitable O rings, such as 31 in Figure 3, can be included where an absolute seal is desired.

The upper portion 26 of the valve means includes a means 32 associated therewith and adapted to permit engagement with a well string tool (not shown) which is capable of inserting into and removing the valve means from the valve seat. Circumferentially disposed about the upper portion 26 is a means 34 which may take the shape of a shouldered projection. Means 34 is adapted to engage the upper surface retaining means 22 when the valve is in operative position. Spaced below means 34 is a latching means 36 adapted to permit latching engagement with the lower side of the retaining means 22. Advantageously, latching means 36 may take the form and operate as described in U. S. Patent No. 2,679,903. Thus, it can be seen that the shouldered projection prevents downward movement of the valve means and the latching member prevents upward movement of the valve means until the latching mechanism is released.

The intermediate portion 28 of the valve means 24 is provided with a wall inlet aperture 40 or a plurality of such apertures. Advantageously, the wall 18 of the valve seat is provided with perforations 41 spaced around the wall and adjacent the apertures in the intermediate portion of the valve means, i. e., apertures 41 in Figure 1, to facilitate flow. Also, flow to the bore of the valve means can pass through the space just below retaining member 22 in the valve seat.

Below the intermediate portion 28 of the valve means 24 is the bottom portion 30. Disposed within the lower portion 30 is a removable, restricted orifice member 42. The orifice member has its longitudinal axis in substantial alignment with the axis of the bore of the valve means above and below it. Immediately adjacent the orifice on each side are areas 55 having internal diameters which are larger than the valve means bore. The diameter of the throat of the restricted orifice member may vary and to be effective in restricting flow is less than the diameter of the bore of the valve means. As shown, restricted orifice member 42 is placed at a position which is below apertures 40. This removable orifice constitutes a flow control orifice which contributes to the determination of the flow characteristics of the flow control combination.

Bottom portion 30 is provided with an aperture to facilitate passage of fluids from the bore of the valve means to the formation being controlled. The aperture provided in bottom portion 30 is advantageously located in the conical end portion 44 of the bottom portion of the valve means.

To sealingly seat the valve means 24 within the valve seat 16, resilient packing seal 46 is provided. By placing a seal 46 between the inlet and outlet apertures of the valve means 24, flow of fluids through the length of the valve seat 16, unless it passes through the bore of the valve means 24, is prevented. Such seals may be of any construction and be disposed on either the valve seat or the valve body but resilient seals on the valve body are preferred.

Referring especially to Figure 2, spaced below the lowermost portion of the valve means 24 and constituting an extension of the valve seat 16 is a means 48 adapted to prevent ingress of fluids and sands to the valve seat and valve means from the formation. Means 48 desirably takes the form of a check valve means comprising, as shown in Figure 2, a body member 50 having an internal tubular bore. The internal bore of body member 50 is enlarged intermediate its ends. Placed within the enlarged portion of the bore of body member 50 is a spring 54 having a means 56, advantageously a ball, disposed on top thereof and adapted to sealingly engage the portion of the bore through body member 50 which is immediately adjacent the upper end of the enlarged bore. Spaced below the check valve means is a guard 60 associated with the external surface of piping section 10 and adapted to afford protection for the check valve means during insertion and removal of the piping section from a cased well bore.

In the present invention, the opening in the valve seat, which communicates the lower opening in the valve body with the external portion of the pipe section through the check valve means, should not communicate with the pipe section bore except through the valve body. Also, the fluids passing through the valve body should pass through the check valve means and into the formation. These restrictions on flow give effective control of the amount of fluids passing into a given formation, and by changing the size of the orifices in the valve bodies flow can be regulated. In the event it is desired to block off a formation, the removable orifice may be replaced by a solid member. In the invention, the restricted flow paths are defined by the position of the openings in the valve seat and valve body, and the location of the resilient packing seal 46. The bottom portion of the bore of the valve seat does not communicate directly with the bore of the pipe string below the seal 46. In other words, this portion of the valve seat is provided with means to maintain it sealingly separated from communication with the bore of the pipe section other than through the valve means and the openings in the upper portion of the valve means which do communicate with the bore. Suitable means to sealingly separate the lower portion of the valve seat from the pipe section bore advantageously comprise the wall member 18; thus, wall member 18 is desirably a continuous unperforated structure below the seal means as shown in Figures 1 and 3; preventing flow from the bore into the valve seat below the seal.

In operation a plurality of piping sections 10, including the check valve means, are placed in a pipe string in a well bore adjacent a plurality of permeable formations and the sections desirably are packed off as described in our prior application, Serial No. 473,782. Valve means 24 is then lowered into the pipe string by means of a suitable wire tool and directed into a valve seat area at each formation. Fluids to be injected into the formation are then passed downwardly in the pipe string, passed into the valve means through the uppermost apertures therein, passed downwardly through the bore of the valve means through the restricted orifice and out the lowermost aperture and then through the check valve means and into the formation. It can be seen that a fluid pressure must be employed which is sufficient to effect an opening of the check valve means. On the other hand, it can be seen that the check valve means selectively prevents the passage of unwanted fluids and sand from the formation into the valve seat area and the valve means disposed therein. The rate of flow of fluids entering the formation is controlled by the characteristics of the removable restricted orifice member 42 previously described. For example, increased or decreased flow into a particular formation can be obtained simply by raising a given valve member to the surface by use of a wire tool and then inserting an orifice member having a larger or smaller throat diameter as the case may be. It will be appreciated that the rates of flow of fluids to different formations can be made similar or different, merely by the proper choice of throat diameter for the removable restricted orifice.

The valve means can be inserted or removed from a valve seat at any level in the well regardless of whether other valved sections are disposed in an overlying position in the pipe string since the valve seat, the valve body and the laterally offset section 14 are proportioned so that the valve body can pass by the valve seat and through the bore of the pipe section. By using a wire line with a suitable tool a given valve body can be inserted or removed from the pipe string even though the string may contain a large number of the laterally enlarged pipe sections. Thus, simple and effective control is obtained for injecting fluids from any number of vertically spaced packed off formations.

We claim:

1. Apparatus of the type described comprising a pipe section having a through bore and having a laterally enlarged portion intermediate the ends of said section, a tubular valve seat in said laterally enlarged section, said valve seat being in communication at an upper portion with the bore of said pipe section and having an opening in a lower end portion communicating externally of said pipe section; a flow-restrictive bored valve means removably disposed in said valve seat, said valve means being adapted to be removed and inserted in said valve seat by a well tool insertable into said pipe section, said valve means, valve seat and laterally enlarged portion of said pipe section being proportioned to enable the valve means to pass through said pipe section bore, an opening in an upper portion of said valve means communicating with the bore of said valve means and the bore of said pipe section, an opening in a lower portion of said valve means communicating with the bore of said valve means and the opening in a lower portion of said valve seat, flow preventing means disposed between the valve seat and valve means intermediate the upper and lower openings in the valve means, means to sealingly separate the valve seat below said flow preventing means from direct communication with the bore of said pipe section and a check valve means external of said pipe section and communicating with the opening in a lower end portion of said valve seat, said check valve means adapted to permit flow through said tubular valve means and through said opening in the lower portion of said valve seat.

2. The apparatus of claim 1 in which said flow preventing means is a resilient seal.

3. The apparatus of claim 1 in which a removable restricted orifice member is disposed in the bore of the valve means between said valve means opening.

References Cited in the file of this patent

UNITED STATES PATENTS

| 1,310,615 | Greenlee | July 22, 1919 |
| 2,227,539 | Dorton | Jan. 7, 1941 |
| 2,604,169 | Miller | July 22, 1952 |
| 2,611,436 | Carr et al. | Sept. 23, 1952 |
| 2,664,162 | Howard et al. | Dec. 29, 1953 |
| 2,679,903 | McGowen et al. | June 1, 1954 |
| 2,679,904 | Howard et al. | June 1, 1954 |
| 2,699,730 | Bryan | Jan. 18, 1955 |
| 2,745,497 | Dale et al. | May 15, 1956 |